UNITED STATES PATENT OFFICE.

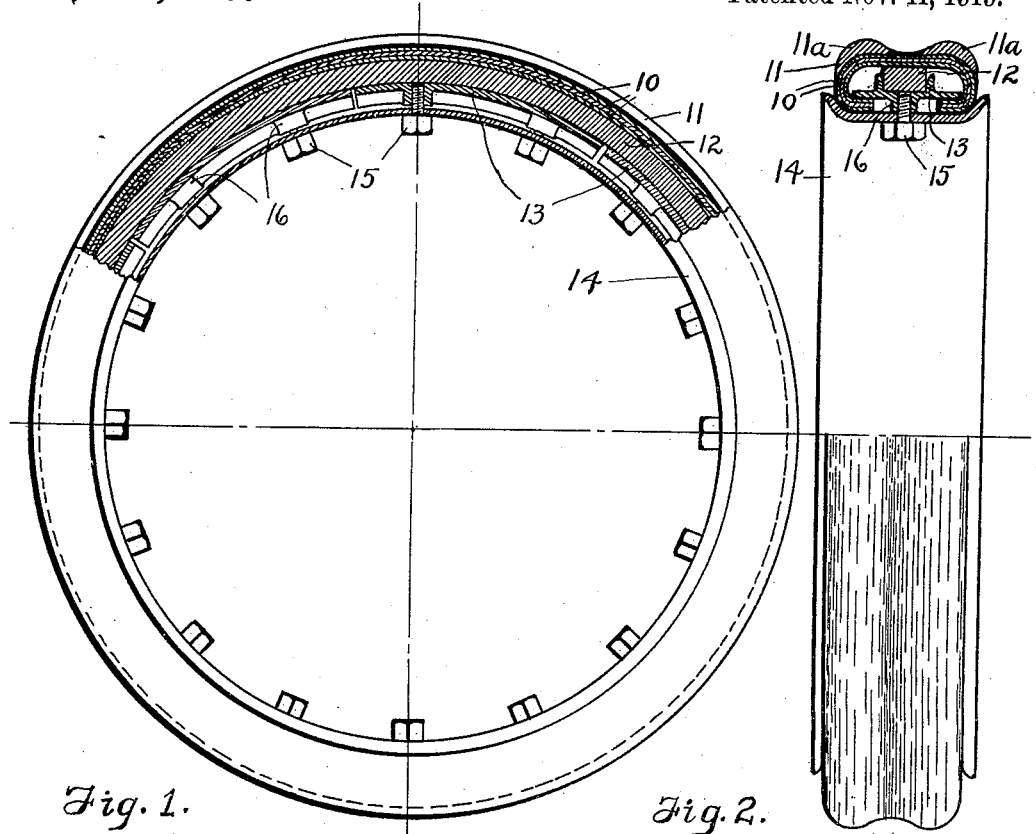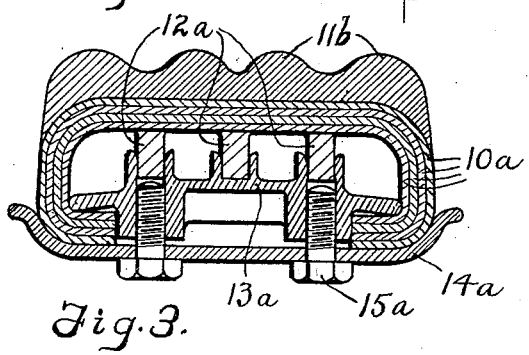

AUGUST J. MEYER, OF CHICAGO, ILLINOIS.

TIRE.

1,321,466.  Specification of Letters Patent.  Patented Nov. 11, 1919.

Application filed September 28, 1916. Serial No. 122,598.

*To all whom it may concern:*

Be it known that I, AUGUST J. MEYER, a citizen of the United States, residing at Chicago, in the county of Cook and State of Illinois, have invented a certain new and useful Improvement in Tires, of which the following is a specification.

My invention relates to an improved tire construction for use particularly in connection with motor vehicles by which a sufficient cushioning action is secured to protect the wheel and vehicle without the use of air under pressure in the tire. My invention consists in providing a fabric body portion for the tire having a plurality of circumferential supports from the rim of the wheel between which supports clearance spaces are provided to allow the fabric to yield to a greater degree at these spaces than at the supports. The fabric body portion has secured to its outer surface a resilient tread portion provided with circumferential corrugations, the projecting portions of the corrugations being in the planes of the air spaces within the body portion, and the smaller diameter portions of the tread being in the planes of the supports for the body portion from the rim. The fabric body portion and its supports are themselves somewhat resilient, the portions between the supports being much more so than are the supports, and the tread portion is preferably made more resilient that the body portion and its supports, so that the entire structure equalizes shocks of varying degrees which may be imparted to the tire, so that there is practically no rebound resulting from the striking of obstructions or irregularities in the roadway by the wheel.

My invention will best be understood by reference to the accompanying drawings, showing the preferred embodiments of my invention, in which—

Figure 1 shows my tire in side elevation mounted upon a rim, a part of the tire and rim being shown in section, Fig. 2 is an edge elevation of the parts shown in Fig. 1, the upper portion of the figure being sectioned through the rim and tire to more clearly illustrate the construction, and Fig. 3 is a transverse sectional view through the rim and tire of a modified construction.

Similar numerals refer to similar parts throughout the several views.

As shown in Figs. 1 and 2, the tire consists of a body portion 10 of flexible material formed, preferably, by securing together a plurality of thicknesses of rubberized fabric by vulcanizing the thicknesses together. The body portion thus produced has a certain amount of resilience which, however, is not sufficient to produce the degree of cushioning effect required of tires for motor vehicles. A tread portion 11, formed preferably of rubber, is vulcanized to the outer surface of the body portion, the rubber being made so that it has a considerable degree of resilience to absorb the minor irregularities in the roadway without materially compressing the body portion. The outer surface of the tread 11 is corrugated forming a plurality of tread ribs $11^a$ and between these tread ribs there is secured to the inside of the body portion 10 an inwardly extending rib 12, preferably of rubber, which is vulcanized to the body portion. The rib 12 is preferably harder and less resilient than the tread without being entirely rigid, so that when the tire strikes a considerable obstruction in the roadway the rib may yield to a certain extent after the tread has yielded to a sufficient extent to permit the obstruction to bear upon the portion of the tire outside of the rib.

The rib 12 is supported by a plurality of arc-shaped members 13 provided with outstanding flanges to receive the rib between them and these members are in turn rigidly secured to the outer surface of the rim 14 by cap screws 15, suitable bosses 16 being formed on and projecting inwardly from said members to provide clearance spaces between said members and the outer surface of the rim when the screws 15 are drawn up tightly.

In placing the tire on the wheel the members 13 are put in place on the rib 12 and the assembled structure is forced over the projecting edge of the rim 14, the edges of the base 10 being between the inner surface of the members 13 and the outer surface of the rim 14. The screws 15 are then put in place which results in securely clamping the edges of the body portion 10 to the rim 14.

As a result of the construction described, air spaces are formed within the body portion 10 in the planes of the tread ribs 11ª and these tread ribs it will be observed, are supported from the rim by the side walls of the body portion and the rib 12. When the tire is in operation the tread ribs 11ª of the tread first engage obstructions that may be in the roadway and if these obstructions are of a minor nature the tread ribs themselves yield sufficiently to cushion the blow upon the tire with little or no compression of the rib 12 and the edge walls of the body portion 10. If, however, the obstruction is a relatively large one, after the tread ribs 11ª of the tire have been compressed, so that the tread between the tread ribs engages the obstruction, a further compression to a slight degree may be produced by compression of the rib 12 and the edge walls of the body portion 10, the latter, however, being opposed to a greater degree than compression of the tread ribs, since the material of the rib is more rigid than is the material of the tread ribs. It will, of course, be appreciated that obstructions of different sizes must be met by the tire and that all grades of compression will result, for most of which the tread ribs will afford a sufficient cushioning action without perceptible compression of the rib 12, and that depending upon the extent to which the tread ribs are compressed, the portions of the body portion 10 inside of the tread ribs will yield to a greater or less extent, depending upon the size of the obstruction, and that this yielding is readily permitted on account of the air spaces within the tire and that little or no rebound results since the air in the tire is not under pressure.

In the construction shown in Fig. 3 a plurality of inwardly extending ribs 12ª are secured to the inner surface of the body portion 10ª and the tread is provided with a larger number of tread ribs 11ᵇ, the number being such that there is always a tread rib for each air space formed in the body portion by the ribs 12ª, that is to say, the number of tread ribs is preferably one more than the number of ribs. The tire supporting members 13ª are similar to the tire supporting members 13, the principal difference being that outwardly extending flanges are provided for each of the ribs 12ª and two rows of cap screws 15ª are employed to hold the members 13ª to the rim 14ª. It is preferable that the inner ends of the bosses receiving the cap screws shall not come quite in contact with the rim when the screws are drawn up to insure that the edges of the body portion may be securely held in place upon the rim.

The operation of the construction shown in Fig. 3 is the same as that described for the construction shown in Figs. 1 and 2, the only difference being that the tire will properly handle a larger load than will the tire shown in Figs. 1 and 2, assuming that the materials of the ribs, the body portion and the tread are the same in both cases.

While the rims shown in the drawings are provided with outwardly extending edges of somewhat larger diameter than the central portion of the rims, it will be understood that other forms of rims, as for example, those having straight sides or what are known in the trade as quick detachable rims, may be employed for supporting the tire and, in fact, any construction of rim affording a proper seat for the base when clamped in position by the screws in the manner referred to.

As a result of my invention I have provided a tire construction which readily yields to cushion the wheel over obstructions of different size and as a result of the coöperation between the flexible and somewhat resilient body portion, the more resilient tread corrugations, the less resilient ribs and the air spaces within the base, there is a minimum tendency of the wheel to rebound upon striking any ordinary obstruction with the result that the vehicle rides much more smoothly and evenly with tires of this kind than with pneumatic tires.

While I have shown my invention in the particular embodiments above described, it will be understood that I do not limit myself to these exact constructions, as I may employ any equivalents thereof known to the art at the time of the filing of this application without departing from the scope of the appended claims.

What I claim is:

1. In a tire, the combination of a body portion consisting of a plurality of thicknesses of rubberized fabric vulcanized together, a circumferential rubber rib projecting inwardly from said body portion and vulcanized thereto forming circumferential air spaces in said body portion, and a rubber tread vulcanized to the outer surface of said body portion and having circumferential tread ribs projecting outwardly from said body portion in the planes of said air spaces.

2. In a tire, the combination of a body portion consisting of a plurality of thicknesses of rubberized fabric vulcanized together, a plurality of substantially parallel rubber ribs projecting inwardly from said body portion and vulcanized thereto forming circumferential air spaces in said body portion, and a rubber tread vulcanized to the outer surface of said body portion and having circumferential tread ribs projecting outwardly from said body portion in the planes of said air spaces.

3. In a tire, the combination of a body portion consisting of a plurality of thicknesses of rubberized fabric vulcanized together, a plurality of substantially parallel rubber ribs projecting inwardly from said body portion and vulcanized thereto forming circumferential air spaces in said body portion, a rubber tread vulcanized to the outer surface of said body portion and having circumferential tread ribs projecting outwardly from said body portion in the planes of said air spaces, arcuate members for holding the edges of the body portion upon a rim and having outwardly projecting flanges laterally supporting said ribs, and devices for holding said members upon said rim.

4. In a tire, the combination of a flexible body portion, devices for clamping the edges of the body portion to a rim, a resilient tread secured to the outer surface of the body portion and having tread ribs projecting outwardly from the body portion, and a rib of resilient material inside of said body portion in a plane between the planes of said tread ribs, whereby annular air spaces are formed within said body portion in the planes of said tread ribs, said inner rib being supported by said clamping devices.

5. In a tire, the combination of a flexible body portion, devices for clamping the edges of the body portion to a rim, a resilient tread secured to the outer surface of the body portion and having tread ribs projecting outwardly from the body portion, and a plurality of annular and substantially parallel ribs of resilient material inside of said body portion in planes between the planes of said tread ribs, whereby annular air spaces are formed within said body portion in the planes of said tread ribs, said inner ribs being supported by said clamping devices.

6. In a tire, the combination of a flexible body portion, a resilient tread secured to the outer surface of the body portion and having tread ribs projecting outwardly from the body portion, and a rib of resilient material inside of said body portion and having an inner radius larger than the inner radius of the body portion to permit supporting said inside rib by inner retaining mechanisms for holding the body portion in place.

7. In a tire, the combination of a flexible body portion, a resilient tread secured to the outer surface of the body portion and having tread ribs projecting outwardly from the body portion, and a plurality of annular and substantially parallel ribs of resilient material inside of said body portion and of larger inner radius than the inner radius of the body to permit supporting said inside ribs by retaining devices within the body portion to hold the latter in place.

8. In a tire, the combination of a flexible body portion, a resilient tread secured to the outer surface of the body portion, a plurality of annular and substantially parallel ribs of resilient material inside of said body portion, and clamping devices for clamping the body portion radially of the tire to hold said body portion in place, said clamping devices supporting said inside ribs.

In witness whereof, I hereunto subscribe my name this 23rd day of September, A. D. 1916.

AUGUST J. MEYER.

Copies of this patent may be obtained for five cents each, by addressing the "Commissioner of Patents, Washington, D. C."